United States Patent [19]
Koehle

[11] 3,899,802
[45] Aug. 19, 1975

[54] FASTENER MEANS FOR AN ARTICLE OF JEWELRY

[75] Inventor: Joachim Koehle, Pforzheim, Germany

[73] Assignee: J. Koehle KG, Pforzheim, Germany

[22] Filed: Feb. 5, 1974

[21] Appl. No.: 439,697

[30] Foreign Application Priority Data
Feb. 27, 1973 Germany............... 2309681

[52] U.S. Cl.......... 24/73 HR; 24/241 S; 24/241 PP; 24/241 SP; 63/1 A
[51] Int. Cl.²................... A44B 13/00; A44B 21/00
[58] Field of Search........ 24/241 S, 241 WB, 241 P, 24/241 PP, 241 SP, 73 HR, 73 TH, 73 HL, 73 HH, 232, 201 BN; 63/2, 1 A

[56] References Cited
UNITED STATES PATENTS

| | | | |
|---|---|---|---|
| 366,462 | 7/1887 | Cotter | 24/241 P |
| 863,002 | 8/1907 | Seely | 24/241 P |
| 2,232,668 | 2/1941 | Schupbach | 70/459 |
| 2,795,025 | 6/1957 | Wexler | 24/241 SP |
| 3,168,768 | 2/1965 | Bohlinger | 63/2 |

FOREIGN PATENTS OR APPLICATIONS

| | | | |
|---|---|---|---|
| 1,074,921 | 2/1960 | Germany | 24/241 S |

Primary Examiner—Bernard A. Gelak
Attorney, Agent, or Firm—Lawrence E. Laubscher

[57] ABSTRACT

Fastener means for an article of jewelry are disclosed including a decorative first member, and a resilient generally C-shaped split ring member hingedly connected in a spaced manner to the back of the first member. A bridge member extends axially rearwardly of said first member for insertion into the opening contained in the split ring member whereupon the extremities of the resiliently biased arms of the split ring member are biased together in locking engagement with the lateral surfaces of the bridge member. Preferably a safety fastener member is pivotally connected with the bridge member to lock the split ring member in the closed position parallel with and spaced from the rear surface of the first member.

9 Claims, 8 Drawing Figures

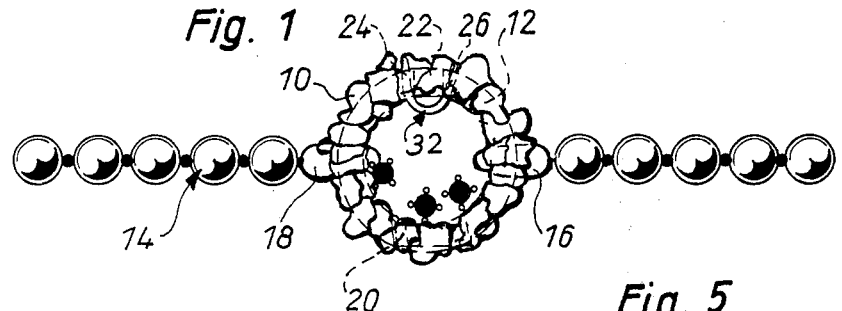
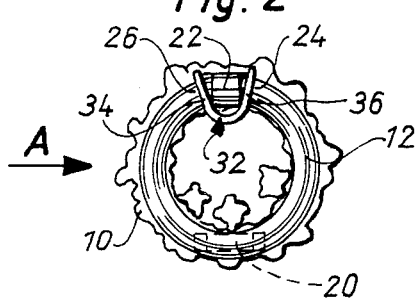
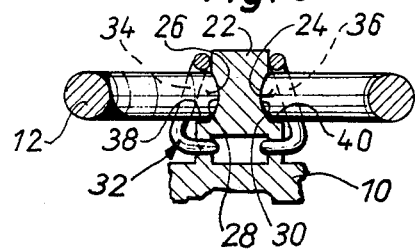
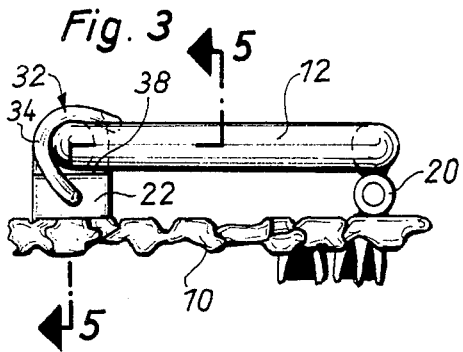
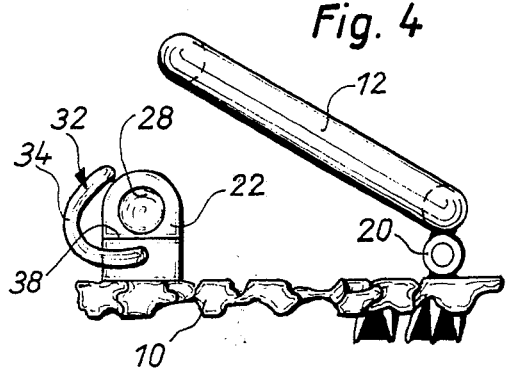
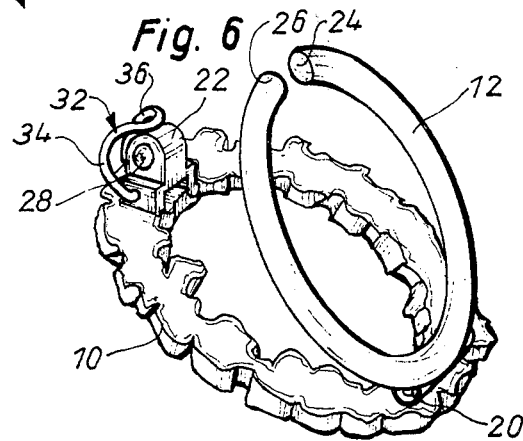
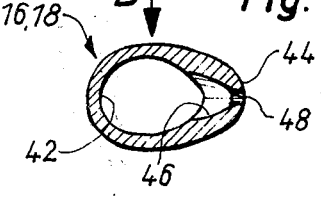
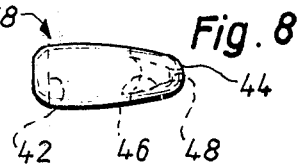

FASTENER MEANS FOR AN ARTICLE OF JEWELRY

This invention relates to fastener or locking means for ornamental chains, necklaces, and the like, with two annular fastener members which can be swung mutually with respect to each other in their closed position and which can be mutually locked, and of which at least one contains an opening, where, when it is open, it is possible to stick corresponding eyelets or loops of a chain of a necklace upon the two ring-end-pieces and where, in the closed position of the open ring, a bridging member, arranged on the other closing member, engages in the open ring part.

Fastener means with mutually lockable closure members, of which at least one member is designed as an open ring, are already known in the form of key rings. In one known version, the other lock member is designed as a longitudinal small plate or flat metal strip which, with one of its ends, is attached to the annular lock member opposite the latter's open ring point in a swingable manner and which, with its free end piece, can be engaged in the open part of the annular lock member for the purpose of closing the same (see, for example, the Austrian Pat. No. 149,185 and the U.S. Pat. No. 2,232,668).

Fastener means of this design are not suitable for necklaces or chains because their design hardly makes it possible to achieve the esthetic effect necessary for jewelry.

The situation however is different in connection with another known design of a lock according to the French Pat. No. 424,053. In this design, both fastener members are annular, and when the lock is closed, they are coaxially so arranged with respect to each other that the lock has the appearance of a compact closed ring. This lock, according to its outward appearance, would be more suitable as a fastener for decorative or ornamental chains and the like, but the design here is an obstacle. In this known version, both fastener members constitute open rings which are movably connected with each other by means of a hinge. Each ring is furthermore equipped with a bridging member which can engage — in the closing position of the closing rings, in a formlocking manner — in the ring opening of the particular other ring, whereby both locking rings come to rest against each other in this position.

To this lock there can be attached an eyelet of a key or also of an ornamental chain only if the key or the chain — after placement upon one locking member — is moved to a very specific circumferential point on that locking member. This is necessary because both locking rings, as we said before, come to rest against each other in their closed position. But they can be placed against each other only if the eyelets are first moved into the area of the ring, in which the particular bridging member of the ring is, so that the eyelet — upon the closing of the lock, respectively, when the two rings are placed against each other — can pass through the open circumferential portion of the other rings. One can easily see how difficult it would be, for example, to place on such fastener means the chain eyelets of ornamental chains which usually have a diameter of a few millimeters and which have a thickness which may be less than 1 mm, whereby they are usually emplaced when the ornamental chain is being put on. In this case, much patience and manual dexterity would be required in order to move the chain eyelets into the particular correct position along the particular locking member.

The purpose of the present invention is to design a lock of this kind in such a manner that it will offer advantages not only in terms of its operation but also in terms of its design.

Accordingly, a primary object of the present invention is to provide fastener means including a decorative first member, and an annular generally C-shaped resilient split ring member hingedly connected with the rear surface of the first member. A bridging member secured to the rear of the first member is adapted to extend in the opening between the resilient arms of the split ring member when said split ring member is in the closed position parallel and spaced from the rear surface of the decorative first member.

According to another feature of the invention, the fastening of chain eyelets presents no problem inasmuch as these eyelets must merely be stuck on the ring ends of the open locking ring, after which that locking ring must be swung into its closed position. Accordingly, no special orientation of the eyelets on this ring is required. The positive operation of the lock is thus assured without having to look at the lock and by using only a small amount of manual dexterity. Moreover, the lock design according to the present invention offers the special advantage that the decorative first member can serve as a cover for the split ring member so that the actual retention of chain eyelets is concealed in this lock and can be observed only from the side of the first member since the chain ends are moved toward the lock. Just exactly how these ends are connected with the first member is concealed in accordance with an important advantage of the invention. Thus, the possibility is presented for designing the closed locking ring for example as a brooch-like jewelry piece, whereby the arrangement of the chain eyelets in terms of the taste design can be completely disregarded. Here it is desirable if the extremities of the arms of the split ring member can be engaged on the bridging member by means of conventional recesses. In accordance with a further advantageous development, they are positively retained in their engaged closed position on the bridging member by means of a safety member.

A favorable design can be obtained here if we use, as the safety member, a resilient loop arranged pivotably on the bridging member and this loop, when in the safety position, protrudes with resilient loop parts over the engaged arms of the split ring member to lock the same on the bridging member.

A particularly advantageous design can be obtained in this connection if the swing-loop is V-shaped and if its leg, which is held on the bridging member, is bent roughly in a semi-circular form in order to overlap the arm extremities of the split ring and if the interval between the free, V-shaped loop end and the pivot axis of the safety fastener is slightly smaller than the interval between the upper, preferably semicircular end of the bridging member and the loop pivot axis. This construction offers the advantage that, during the pivoting of the safety fastener loop into its safety position, a pressure point must be overcome, through the cooperation of its V-shaped loop end with the upper end of the bridging member, before the safety fastener loop can move into its final safety position. This means that a pressure point must be overcome also in order to swing the safety fastener loop back into its release position and this means that the split ring member is secured in the optimum fashion in its engagement position.

The eyelets of a jewelry chain or a necklace, which can be stuck upon the annular locking member, are advantageously designed in a round-oval or elliptical form so that it will be possible to cause the space between the decorative first member and the annular split ring member, in the closed position, to be as small as possible. In order to be able to attach the eyelets to the jewelry chain or necklace in an elegant fashion, it is proposed by way of improvement of such an eyelet that one of its end pieces be made thicker in the direction toward the major axis and that this thicker end piece be perforated in the direction toward the major eyelet axis and that, in the thickened eyelet part, there be provided a recess which will be accessible from the inside circumference of the eyelet, a recess into which the drill hole would run. This recess can receive a knot or a differently designed boss of the part of a longitudinal member to be attached to the eyelet so that the part will not be visible toward the outside.

Other objects and advantages of the invention will become apparent from a study of the following specification when viewed in the light of the accompanying drawing, in which:

FIG. 1 is a front elevational view of the article of jewelry in connection with which the fastener means of the present invention are utilized.

FIG. 2 is a view of the reverse side of the lock when in the closed condition;

FIG. 3 is an end view of the lock looking in the direction of arrow A in FIG. 2;

FIG. 4 is an illustration similar to FIG. 3, with the lock open;

FIG. 5 is a partial cross-section view taken along line 5—5 of FIG. 3;

FIG. 6 is a perspective drawing of the opened lock, when viewed from the reverse side;

FIG. 7 is a cross-section view through an eyelet for the anchoring of a jewelry chain, which eyelet can be stuck upon the ring-shaped lock member;

FIG. 8 is a view of the eyelet when viewed in the direction B of FIG. 7.

The fastener means illustrated in FIGS. 1 – 6 includes a decorative first member 10 which serves as carrier and a decorative generally C-shaped split ring member 12 which can be moved relative to the first member from an open position to a closed position. The split ring member 12 is arranged on the rear side of the first member 10 which, in turn, for example, may be designed like a wreath-shaped brooch. As can be seen from FIG. 1, eyelets 16 and 18, respectively, are mounted on the split ring member 12 at the ends of a jewelry chain 14. As shown in FIG. 6, the split ring member 12 is designed as a resilient open ring which is pivotally connected by means of a hinge connection 20 to the reverse side of the decorative member 10. This hinge connection is arranged diametrically opposite the opening contained in the split ring member 12. A bridging member 22 is associated with the ring opening on the reverse side of the first member 10 for the purpose of fastening the split ring member 12. In the closed position, the bridging member, according to FIGS. 2, 3, and 5, engages in the ring opening. The mutual interval between the two extremities 24 and 26 of the split ring member is smaller than the width of the bridging member 22 which contains a pair of recesses 28, 30 along its lateral outwardly facing surfaces. The ring-end pieces 24, 26, which are rounded off along their ends, snap, when the ring-shaped closing member 12 is in the locking position, in a resiliently locked manner into those recesses 28, 30 of the bridging member so that the latter is retained in the closed position illustrated in FIGS. 2 and 3. In the open position shown in FIGS. 4 and 6, the previously mentioned eyelets 16, 18 of an ornamental chain are mounted upon the lock member 12. In order to secure the split ring member in its closed position, there is provided a safety fastener 32 which is pivotally mounted on the bridging member. As shown in FIG. 2, the fastener is generally V-shaped, and as shown in FIG. 3, is so designed in the form of a hook that it will extend over the arms 24, 26 with its legs 34, 36. As can be clearly seen from FIG. 4, the interval between the free loop end of the fastener and its pivot axis is selected somewhat smaller than the interval between the upper, preferably semicircular end of the bridging member 22 and the pivot axis of the fastener. As a result, it is first of all necessary to overcome a pressure point before the fastener can snap into its safety position. In this way we have created an effective block against any automatic reverse swinging of the swing loop. From FIGS. 4 and 5 we can furthermore see that there are associated with the second lock member 12 on the bridging member a pair of horizontal laterally extending contact surfaces 38, 40 which are engaged by the end pieces 24, 26 of the split ring member when the latter is swung into its closed position.

The design of eyelets 16 or 18 is illustrated in FIGS. 7 and 8. Looking in the direction of their opening 42, each of these eyelets is round-oval or approximately elliptical and one of its ends designated at 44 is made thicker in the direction of the major axis of the ellipse. In this thicker portion there is arranged a recess 46 which is accessible from the inside circumference of the eyelet and into which runs a drill hole 48 which is placed in the thickened portion in the direction of the major axis of the ellipse. From FIG. 8 it can be seen that the eyelet has its smallest width at the thickened terminal piece 44.

Into the drill hole 48 of the eyelet there must be inserted a thread or some other connecting member for the individual links of the chain, and after insertion it must be knotted, whereby this knot or some other suitable boss is drawn into the recess 46 and thus cannot be seen from the outside.

While in accordance with the provisions of the Patent Statutes the preferred form and embodiment of the invention has been illustrated and described, it will be apparent to those skilled in the art that various changes may be made in the disclosed apparatus without deviating from the inventive concepts.

What is claimed is:

1. An article of jewelry, comprising
   a. a first member (10) having a rear surface and a decorative front surface;
   b. a resilient generally C-shaped split ring member (12) having a pair of arm portions between the extremities (24, 26) of which is defined an opening;
   c. hinge means (20) pivotally connecting the split ring member to the rear surface of said first member for pivotal movement between parallel closed and angularly arranged open positions relative to said first member, 1. said hinge means being arranged between said first and split ring members to cause the same to be spaced when said members are in the parallel closed position,
2. said hinge means being diametrically opposed to the opening contained in said split ring member; and
d. a bridge member (22) secured to and extending axially rearwardly from the rear surface of said first member opposite said split ring opening, said bridge member having a width dimension slightly greater than the spacing distance between the ends of said split ring member, whereby when said bridge member is inserted into the opening in the split ring member, the split ring member is locked in the closed position by the resilient force of the split ring arm portions.

2. Fastener means as defined in claim 1, wherein said first member is annular and has a mean diameter which corresponds generally with that of said first member, whereby said first member has the configuration of a wreath-shaped brooch and conceals said split ring member.

3. Fastener means as defined in claim 1, wherein the oppositely facing lateral surfaces of said bridge member contain locking recesses (28, 30) for receiving the extremities of said split ring arm portions when said split ring member is in the closed position.

4. Apparatus as defined in claim 3, and further including safety fastener means (32) connected with said bridge member for fastening said split ring member in the closed position.

5. Fastener means for an article of jewelry, comprising
   a. a first member (10) having front and rear surfaces;
   b. a resilient generally C-shaped split ring member (12) having a pair of arm portions between the extremities (24, 26) of which is defined an opening;
   c. hinge means (20) for pivotally connecting to the rear surface of said first member said split ring member at a point thereon circumferentially spaced from said opening, said hinge means being arranged between said members to space the same by a given distance, said split ring member being pivotable between a closed position parallel with and spaced from the rear surface of said first member and an open position angularly arranged relative to said first member;
   d. a bridge member (22) secured to and extending axially rearwardly from the rear surface of said first member opposite said split ring opening, said bridge member having a width dimension slightly greater than the spacing distance between the ends of said split ring member, whereby when said bridge member is inserted into the opening in the split ring member, the split ring member is locked in the closed position by the resilient force of the split ring arm portions; and
   e. safety fastener means (32) connected with said bridge member for fastening said split ring member in the closed position, said safety fastener means comprising a generally V-shaped resilient loop member (32) the leg portions of which straddle and are pivotally connected with said bridge member, said loop member having a bowed central portion adapted to extend in locking engagement over the extremities of the arm portions of said split ring member when said split ring member is in the closed position.

6. Apparatus as defined in claim 5, wherein the leg portions (34,36) of said loop member are bent into a generally semi-circular configuration to partially surround the arms of said split ring member, the dimension between the central portion of said loop member and the pivot axis of said loop member being slightly less than the distance between said pivot axis and the adjacent outer surfaces of the arms of the split ring member when said split ring member is in the closed position, whereby said safety fastener means resiliently locks said split ring member in the closed position.

7. Apparatus as defined in claim 6, wherein said hinge means is arranged diametrically opposite the opening contained in said split ring member.

8. Fastener means for an article of jewelry, comprising
   a. a first member (10) having front and rear surfaces;
   b. a resilient generally C-shaped split ring member (12) having a pair of arm portions between the extremities (24, 26) of which is defined an opening;
   c. hinge means (20) for pivotally connecting to the rear surface of said first member said split ring member at a point thereon circumferentially spaced from said opening, said hinge means being arranged between said members to space the same by a given distance, said split ring member being pivotable between a closed position parallel with and spaced from the rear surface of said first member and an open position angularly arranged relative to said first member;
   d. a bridge member (22) secured to and extending axially rearwardly from the rear surface of said first member opposite said split ring opening, said bridge member having a width dimension slightly greater than the spacing distance between the ends of said split ring member, whereby when said bridge member is inserted into the opening in the split ring member, the split ring member is locked in the closed position by the resilient force of the split ring arm portions; and
   e. a pair of chain eyelets (16, 18) mounted on the arm portions of said split ring member, each of said eyelets being of a generally elliptical form having a thickened portion at one end (44) in the direction toward the major elliptical axis of said eyelet, said eyelet containing a first bore extending normal to said major axis and offset from said thickened end, and a second bore (48) extending normal to and in communication with said first bore through said thickened end portion, the internal end of said second bore being counterbored to define a recess (46) that is accessible from the inside circumference of said eyelet.

9. Apparatus as defined in claim 8, wherein the eyelet has its smallest width at the thickened end, said eyelet becoming progressively wider in the direction of the other end.

* * * * *